US006739800B2

(12) United States Patent
Bevilacqua

(10) Patent No.: US 6,739,800 B2
(45) Date of Patent: May 25, 2004

(54) SELF-FLUSHING GUTTER PIPE

(76) Inventor: Joseph Bevilacqua, 1341 Copley Ave., Akron, OH (US) 44320

( * ) Notice: Subject to any disclaimer, the term of this patent is extended or adjusted under 35 U.S.C. 154(b) by 0 days.

(21) Appl. No.: 10/274,396

(22) Filed: Oct. 18, 2002

(65) Prior Publication Data

US 2003/0091392 A1 May 15, 2003

Related U.S. Application Data

(63) Continuation-in-part of application No. 09/732,795, filed on Dec. 8, 2000, now Pat. No. 6,467,995, which is a continuation-in-part of application No. 09/400,720, filed on Sep. 21, 1999, now Pat. No. 6,202,700.
(60) Provisional application No. 60/112,593, filed on Dec. 17, 1998.

(51) Int. Cl.[7] .......................... E02B 11/00; E01C 11/22; E04D 13/04; B08B 3/02; B08B 9/032
(52) U.S. Cl. ............................. 405/48; 405/44; 52/11; 134/166 C; 138/108; 404/4
(58) Field of Search ............................. 405/36, 43–49, 405/119; 52/11; 404/2, 4; 134/166 C, 169 C; 138/32, 34, 105, 108, 111, 112, 163, 167, 169

(56) References Cited

U.S. PATENT DOCUMENTS

| 265,716 A | 10/1882 | Taylor ........................ 138/163 |
|---|---|---|
| 1,150,946 A | 8/1915 | Kenlon ........................ 138/32 |
| 2,366,522 A | 12/1945 | Gutman ........................ 405/46 |
| 3,468,130 A | 9/1969 | Gibson ........................ 405/39 |
| 4,183,368 A | 1/1980 | Husted ........................ 134/166 |
| 4,188,154 A | 2/1980 | Izatt ........................ 405/43 |
| 4,239,486 A | 12/1980 | Gomez ........................ 432/225 |
| 4,436,518 A | 3/1984 | Buss ........................ 428/595 |
| 4,590,722 A | 5/1986 | Bevelacqua ........................ 52/169.5 |
| 4,612,742 A | 9/1986 | Bevelacqua ........................ 52/169.5 |
| 4,904,112 A | 2/1990 | McDonald ........................ 405/45 |
| 4,930,272 A | 6/1990 | Bevilacqua ........................ 52/169.5 |
| 5,009,715 A | 4/1991 | Wilson ........................ 134/166 C |
| 5,035,095 A | 7/1991 | Bevilacqua ........................ 52/169.5 |
| 5,660,008 A | 8/1997 | Bevilacqua ........................ 52/169.5 |
| 5,785,454 A | 7/1998 | Ringdal et al. ........................ 405/45 |
| 5,867,945 A | 2/1999 | Scafidi ........................ 52/11 |
| 5,921,711 A | 7/1999 | Sipaila ........................ 405/45 |
| 6,082,052 A | 7/2000 | Kahn ........................ 52/16 |
| 6,082,409 A | 7/2000 | Sagar ........................ 138/132 |
| 6,139,077 A | 10/2000 | Molzan, II ........................ 249/19.1 |
| 6,151,836 A | 11/2000 | McGlothlin et al. ........................ 52/11 |
| 6,223,777 B1 * | 5/2001 | Smith et al. ........................ 138/109 |

* cited by examiner

*Primary Examiner*—Thomas B. Will
*Assistant Examiner*—Tara L. Mayo
(74) *Attorney, Agent, or Firm*—Roger D. Emerson; Timothy D. Bennett; Brouse McDowell

(57) ABSTRACT

A cleaning device for use with a gutter system includes at least a first body portion connected to the top of the gutter pipe. The cleaning device includes a downspout, connected to the gutter, with a flexible segment. The flexible segment can be extended or compressed to allow removal or insertion into a storm drainage pipe. The downspout may pivot at the flexible segment to divert water away from the structure while the cleaning device is in use.

8 Claims, 8 Drawing Sheets

SELF-FLUSHING GUTTER PIPE

This application is a continuation-in-part of application Ser. No. 09/732,795 filed Dec. 8, 2000, now U.S. Pat. No. 6,467,995, which is a continuation-in-part of application Ser. No. 09/400,720 filed Sep. 21, 1999, now U.S. Pat. No. 6,202,700, which claims priority from a U.S. Provisional Application having Serial No. 60/112,593 filed on Dec. 17, 1998.

BACKGROUND OF THE INVENTION

1. Field of Invention

This invention pertains to the art of methods and apparatuses for drainage pipes. More specifically, the invention relates to methods and apparatuses for providing a self-flushing pipe for use with building rain drainage pipe (gutter) systems.

2. Description of the Related Art

The related art deals with providing waterproofing systems to eliminate water from areas around a home, building or other structure. Some prior art waterproofing systems use a porous cylindrical pipe mounted below the level of a basement floor to aid in eliminating water from a basement. The pipe is positioned below and around the perimeter of the basement floor.

U.S. Pat. No. 4,590,722 discloses a drainage system for basements, which was also invented by the present inventor. In this drainage system, a drainage pipe having a rectangular or square cross-section and a plurality of openings located at lower sidewall portions is used. These openings allow water to flow into the pipe from the surrounding area, thus eliminating water on the basement floor. The above-mentioned pipe reduces and/or eliminates water problems.

While other waterproofing systems require excavation and back filling of the exterior perimeter of the house, the above-mentioned drainage system allows waterproofing to be performed inexpensively from inside of the structure.

However, in any waterproofing system, particulate material, such as gravel, dirt, and other debris may flow into a waterproofing pipe. This debris, and the accumulation thereof, decreases the efficiency of the water flow through the pipe. Obstruction of the drainage pipe hinders its performance in channeling water away from the structure. Consequently, it is desirable to flush out the drainage pipe to remove the particulate material causing this obstruction. The invention described herein is designed to overcome the foregoing difficulties of debris accumulation in a drainage pipe and provide better and more advantageous overall results.

In the case of a building rain drainage system, the related art deals with providing drainage systems to catch the rainwater overflow. Some prior art drainage systems use a method whereby the gutter is almost completely enclosed, thus reducing the amount of leaves and twigs that enter the gutter system. However, these systems may not prevent debris from shingles, small twigs, and tree matter, such as nuts, acorns, or seeds, from entering the drainage system along with the water. These small particles and matter can remain in the pipe and obstruct its performance by making the gutters back up and overflow. This problem can even block up an associated downspout. In that situation, the downspout must be disassembled, with the use of tools, to remove the obstruction. The invention described herein is designed to overcome the foregoing difficulties of debris accumulation in an eaves gutter pipe and associated downspout and provide better and more advantageous overall results.

SUMMARY OF THE INVENTION

In accordance with the present invention, a new and improved drainage pipe is provided eliminating the inherent problems with the related art, as discussed above. The waterproofing drainage pipe of the present invention is submerged about the perimeter of the basement floor or a roof. The pipe has an opening allowing water to enter the pipe from an area surrounding the structure, and the drainage pipe directs water away from the structure. Thereafter, the water is delivered out of an end of the drainage pipe, typically into a drainage sewer or culvert.

According to one aspect of the present invention, a drainage apparatus for use in a waterproofing system comprises a hollow drainage pipe having a length, an upper interior surface with a plurality of spaced openings therein, an outlet, and cleaning means affixed to the upper interior surface.

According to another aspect of the invention, the cross-sectional profile of the drainage pipe is rectangular.

According to another aspect of the invention, the drainage pipe comprises an upper section having an inverted U-shaped cross-sectional profile, the upper section including the upper interior surface; a lower section having a U-shaped cross-sectional profile; and, embracing means for selectively securing the upper section to the lower section.

According to another aspect of the invention, the cleaning means comprises a tube having a plurality of spaced holes therein.

According to another aspect of the invention, the tube has a length generally equal to the length of the drainage pipe.

According to another aspect of the invention, the drainage apparatus further comprises extension means extending from a first end of the tube.

According to another aspect of the invention, at least some of the plurality of spaced holes are angled relative to a plane of the upper interior surface.

According to another aspect of the invention, a method is provided for clearing debris from a hollow drainage pipe having a length, an upper interior surface, an outlet, and a plurality of spaced openings therein wherein the drainage pipe is used in a waterproofing system. The method includes the steps of providing cleaning means affixed to the interior surface.

According to another aspect of the invention, the method further comprises the step of causing a fluid to flow into the tube and exit through the plurality of spaced holes to force the debris through the outlet of the drainage pipe.

According to another aspect of the invention, the cleaning means further comprises an extension means at a first end of the tube, the extension means being adapted for use with an associated fluid source, the method further comprising the step of attaching the extension means to the fluid source.

According to another aspect of the invention, a method is provided for assembling a drainage apparatus for use in a waterproofing system wherein the drainage apparatus comprises a drainage pipe having an upper section, a lower section, and embracing means for selectively securing the upper section to the lower section; and, cleaning means comprising a tube having a plurality of spaced holes therein. The method comprises the steps of affixing the tube to an interior surface of the upper section of the drainage pipe; placing the upper section and the lower section in predetermined relationship to each other; and, employing the embracing means to selectively secure the upper section to the lower section.

According to another aspect of the invention, the method further comprising the step of affixing the extension means to a first end of the tube.

One advantage of the present invention is that debris can be easily and quickly removed from the interior of a drainage pipe.

Another advantage of the present invention is that an extension of the cleaning means can be readily adapted for use with a garden hose or pressurized air source.

Another advantage of the invention is that the drainage pipe may be formed of interconnecting U-shaped pieces, allowing for easy attachment of the cleaning tube to the interior surface of the upper section.

Still another advantage of the invention is that the debris can be easily removed from a building rain drainage pipe attached to a structure without the use of a ladder, a separate hose, nor requiring manual removal of the debris.

Still other benefits and advantages of the invention will become apparent to those skilled in the art to which it pertains upon a reading and understanding of the following detailed specification

BRIEF DESCRIPTION OF THE DRAWINGS

The invention may take physical form in certain parts and arrangement of parts, or a preferred embodiment of which will be described in detail in this specification and illustrated in the accompanying drawings which form a part hereof and wherein.

DESCRIPTION OF THE PREFERRED EMBODIMENT

Figure 1:
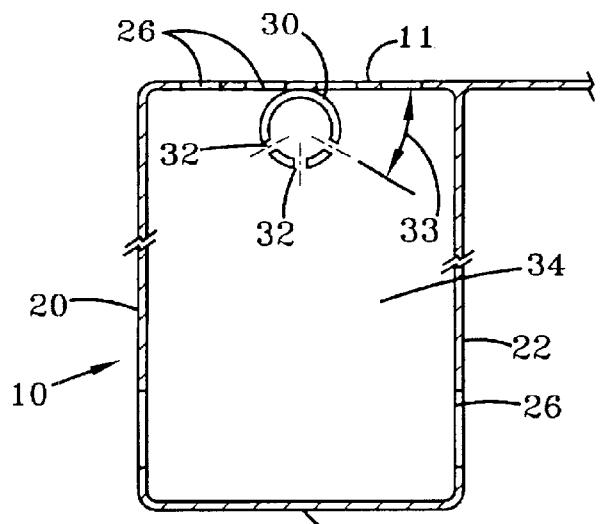
FIG. 1 is an end view of the pipe of the present invention.

Referring now to the drawings, which are for purposes of illustrating a preferred embodiment of the invention only and not for purposes of limiting the same, FIG. 1 shows a cross-sectional view of a hollow drainage pipe 10 having an interior surface 11 for use in a waterproofing system. The drainage pipe 10 includes a plurality of openings 26 therein for allowing water from outside the drainage pipe 10 to enter the drainage pipe 10 and flow to a drainage site.

In the present invention, means are provided to remove and or dislodge debris which may accumulate in the drainage pipe 10. Generally, the cleaning means 28 is affixed to the interior surface 11, spaced from the lowermost part of drainage pipe 10. As will be described in further detail below, the cleaning means 28 directs fluid such as air or water toward the interior surface 11 of the drainage pipe 10 in order to remove and or dislodge any accumulated debris.

Figure 2:
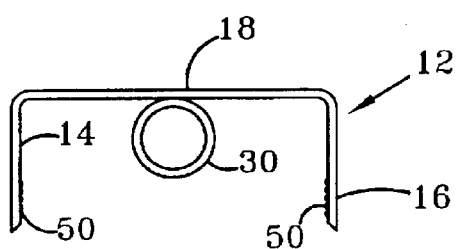
FIG. 2 is an end view of the upper section of the pipe of the present invention.
Figure 3:
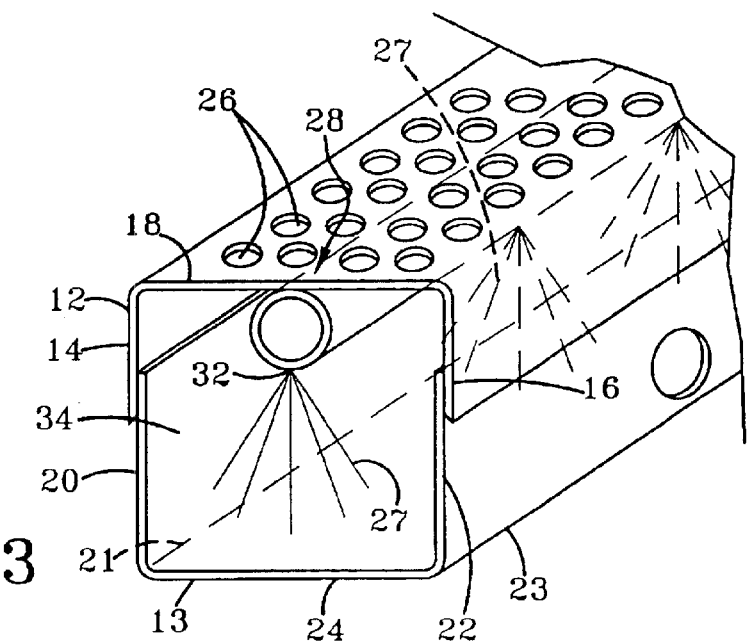
FIG. 3 is a perspective view of the present invention.

The drainage pipe 10 may be rectangular in cross section, however, alternative shapes are within the scope of this invention. As shown in FIG. 2, the drainage pipe 10 includes an upper section 12. The upper section 12 overlaps lower section 13 as shown in FIG. 3. The upper section 12 is an inverted U-shape having sides 14, 16 and a top portion 18. The lower section 13 is U-shaped having sidewalls 20, 22 and base portion 24. In the preferred embodiment, the side sections 14, 16 of the upper section 12 overlap the sidewalls 20, 22 of the lower section 13. Preferably, the drainage pipe 10 includes an embracing means 50 to maintain contact between side sections 14, 16 and sidewalls 20, 22. The embracing means 50 grips or secures the upper section 12 to the lower section 13. The embracing means 50 is shown in its preferred embodiment in FIG. 2 as ridges that extend inwardly from sides 14, 16. It is within the scope of this invention that embracing means 50 comprise a means to either rigidly attach or provide secure closure of the upper and lower sections 12, 13. The objects of the present invention can also be accomplished by a drainage pipe that is comprised of only one piece.

With reference to FIGS. 1 and 2, the present invention includes cleaning means 28 for providing a means to eliminate debris and the like, which may accumulate within the interior portion of the pipe 10. As water enters the pipe 10 through openings 26, debris may be deposited on the base 24, along sidewalls 20, 22 and in the areas where sidewalls 20, 22 meet base 24. Preferably, the cleaning means 28 comprises a tube 30 that is affixed to an interior surface 11 of the upper section 12. The tube 30 has an associated length that conforms generally to the length of the drainpipe 10. Preferably, the inside diameter of the tube 30 is in the range of 0.375 inches (9.525 mm) to 1.5 inches (38.1 mm) and, in its most preferred embodiment, 0.625 inches (15.875 mm). The most preferred diameter given above is the diameter of a standard garden hose. The tube 30 has small holes 32 located along its length such that when a fluid is forced through the tube 30, the fluid exits from theses holes 32. In one embodiment of the invention, the fluid forces debris to move toward an end 34 of the pipe 10. FIG. 3 shows the spray of fluid 27 out of the holes 32 and its downward direction. The pressure at which the fluid sprays out of the holes 32 is dependent upon the size of the holes 32 and the fluid pressure. Preferably the diameter of each hole 32 is in the range of 0.0135 inches (0.0343 mm) to 0.5 inches (12.7 mm) and, in its most preferred embodiment, 0.03125 inches (0.794 mm). With reference again to FIG. 1, in the preferred embodiment, several of the holes 32 are configured such that the fluid sprays out of the tube 30 at a predetermined angle 33 measured with respect to the plane of top portion 18. The holes 32 may be located anywhere along the perimeter and length of the pipe 10. This angled spray 27 acts to push the debris along the base 24 of the pipe 10 and out an end 34 of the pipe 10 and into a drainage sewer or culvert (not shown), or directly onto the yard or ground, or any other place or type of collecting means. In one embodiment, angle 33 measures approximately ±45°. However, the degree of the angle 33 may be any magnitude, chosen with sound engineering judgment. It is envisioned that the current invention cleans out the entire interior of the pipe 10, including the corners 21 and 23 formed at the intersections of sidewalls 20 and 22 with the base portion 24.

Figure 4:
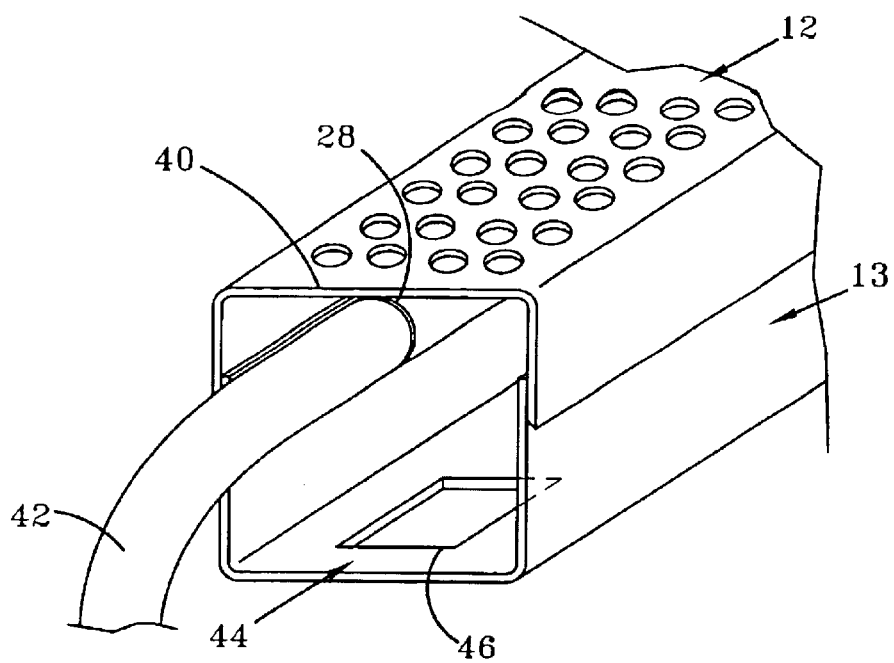
FIG. 4 is a perspective view of the present invention showing the flushing means.

The cleaning means 28 can take on a variety of shapes and configurations. In its preferred embodiment, however, the tube 30 of the cleaning means 28 is connected to an extension means 40 which allows a fluid source, such as a garden hose, to attach to the cleaning means 28. Alternatively, the extension means 40 can be comprised within the cleaning means 28, such as a male or female thread portion. FIG. 4 shows a garden hose 42 attached to the cleaning means 28. Furthermore, in addition to connecting a water source to the system, the current invention contemplates other sources which can be utilized to remove debris from the pipe 10. For example, an air pressure hose can be connected to the cleaning means 28. Thus, by providing air pressure within the pipe 10 the debris may be moved towards the exit area 34 of the pipe 10.

In operation, the extension means 40 can be connected to one end of the cleaning means 28. For example, the extension means 40 may be housed within a panel of the basement wall. To clean out the pipe 10, the panel would be removed exposing the extension means 40 and a water or air hose is then coupled to the extension means 40. Depending upon how the holes 32 are configured, once the air or water supply is turned "on" the debris within the pipe will be forced along the length of the pipe 10 and forced out an end 34 and drain through a connected downspout. Once the debris has been satisfactorily removed from the pipe 10, the water or air hose can be detached from the extension means 40 and the panel within the basement wall can be closed.

An alternative embodiment of the current invention envisions the flushing source 42 permanently connected to the cleansing means 28. The flushing source may be controllable by a control means such as a valve. Thus, when the valve is open, cleansing means 28 is filled with water or air and this water or air exits through the holes 32 of the cleansing means 28 and forces debris out of the pipe and into catch basin or sewer.

As shown in FIGS. 1–4, the openings 26 are defined within the upper interior portion of the pipe 10. In this configuration, water can pass there through and into the pipe for drainage. This geometry is preferable in gutter systems. If large amounts of debris collect within the pipe 10, which cannot be flushed out of the gutter system, the drainage pipe 10 can be disconnected at an access means 44 from the downspout 50 at a predetermined location to flush out the debris as described in greater detail below.

Figure 5:
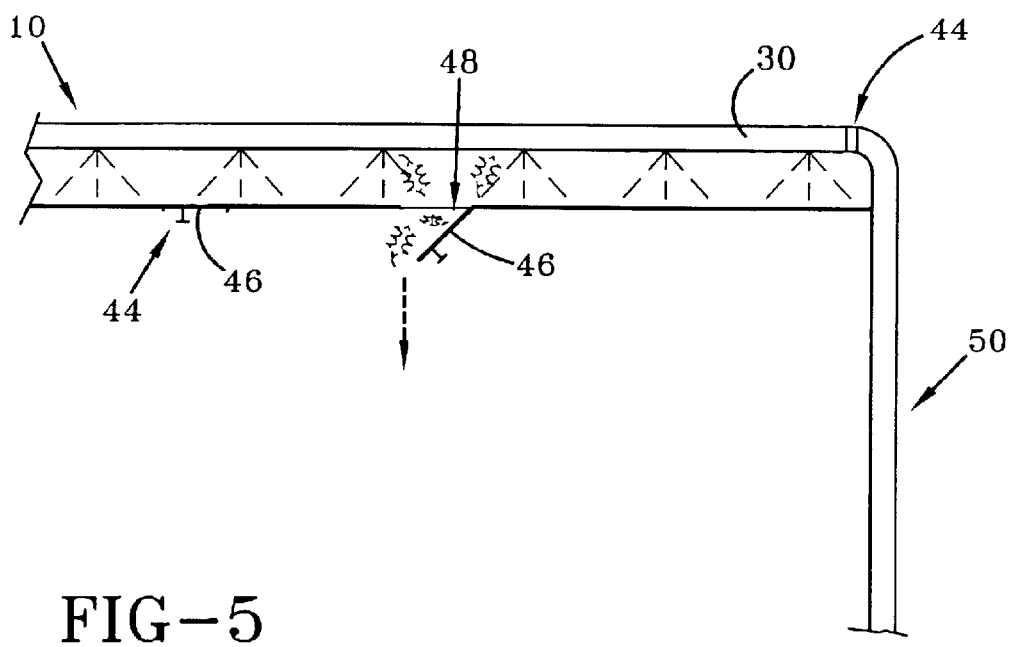
FIG. 5 is a perspective view of the present invention showing access panels within the drainage pipe.

Alternatively, as shown in FIG. 5, the drainage pipe 10 may contain access means 44 at predetermined locations along the length of the pipe 10 to flush out heavily accumulated debris. Access means 44, including without limitation access panels 46, may be operatively connected within the drainage pipe 10 to ensure easy access for cleaning purposes. The access panels 46 may be hingedly or slidably connected to the lower section 13 of the drainage pipe 10, but it is not limited thereto. When using such access panels, the panels can be opened such that a hole 48 is defined therein. The cleaning means is activated such that the associated debris exits the drainage pipe 10 through the hole 48. For example, if wet leaves have accumulated in the drainage pipe 10, the user may force them through the hole 48 defined by the open access panels 46 via the cleaning means 28.

Figure 6:
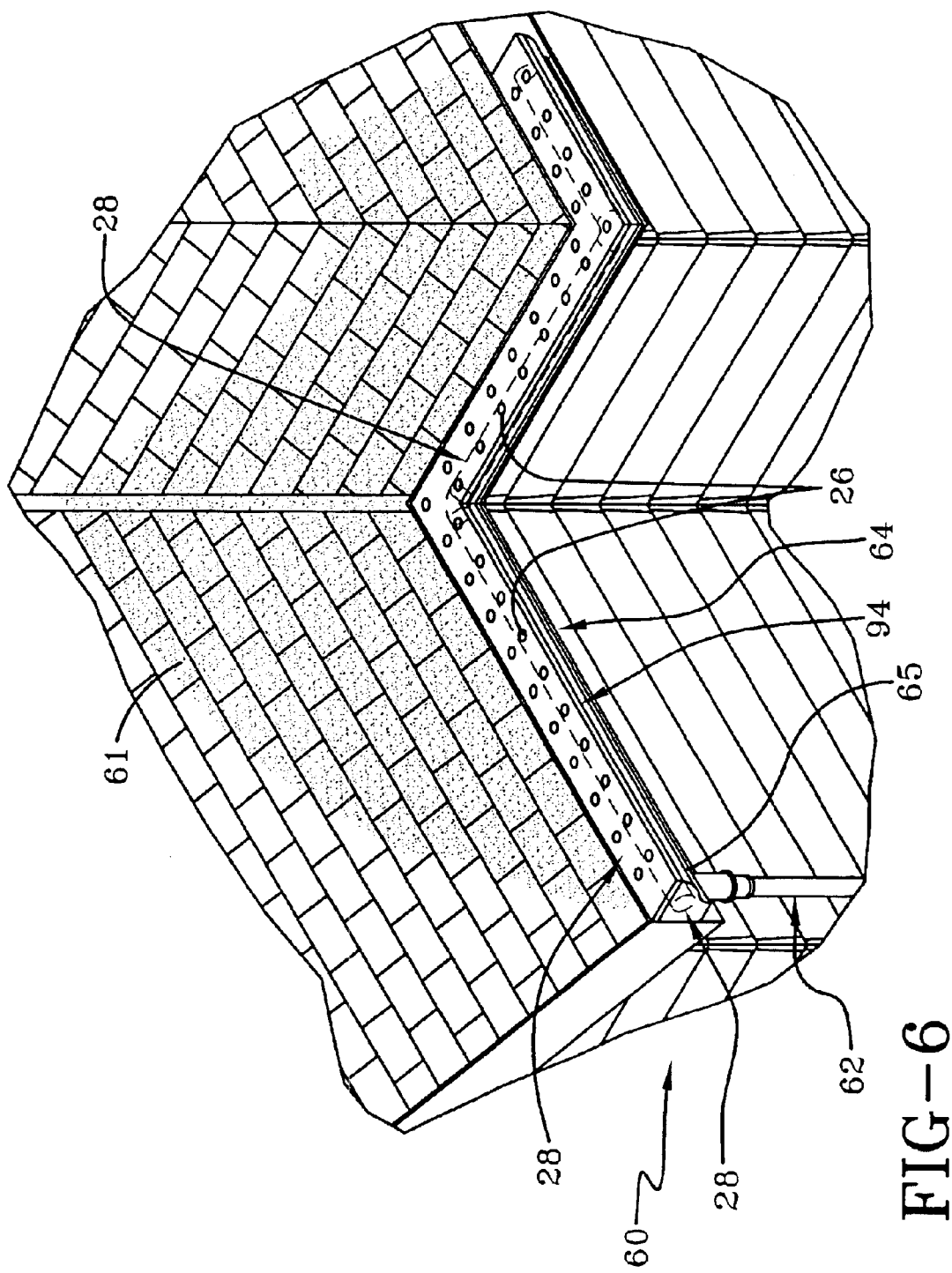
FIG. 6 is a perspective view of the present invention with cleaning means shown in partial cut-away installed on a gutter attached to a building.

Referring now to FIG. 6, a perspective view of the present invention with at least a first body portion 94 and cleaning means 28, shown in partial cut-away, installed on a gutter 64 attached to a structure shown generally at 60 is shown. The first body portion 94 is connected to the top of the gutter and secured with an embracing means 50. The embracing means 50 grips or secures the first body portion 94 to the gutter 64. One embodiment of such embracing means 50 is shown in FIG. 2 as ridges that extend inwardly from sides 14, 16. Although this figure represents a house, other structures such as buildings, garages, offices, and the like can incorporate the inventive drainage system. Attached to the house 60 is a rain drainage pipe or gutter 64. The gutter pipe 64 is a pipe that is generally placed around or under the eaves of the structure 60. The pipe 64 may be attached to a downspout 62 and a structure 60 in a manner well known in the art. Since this attaching manner is so well known, it will not be discussed.

Figure 6A:
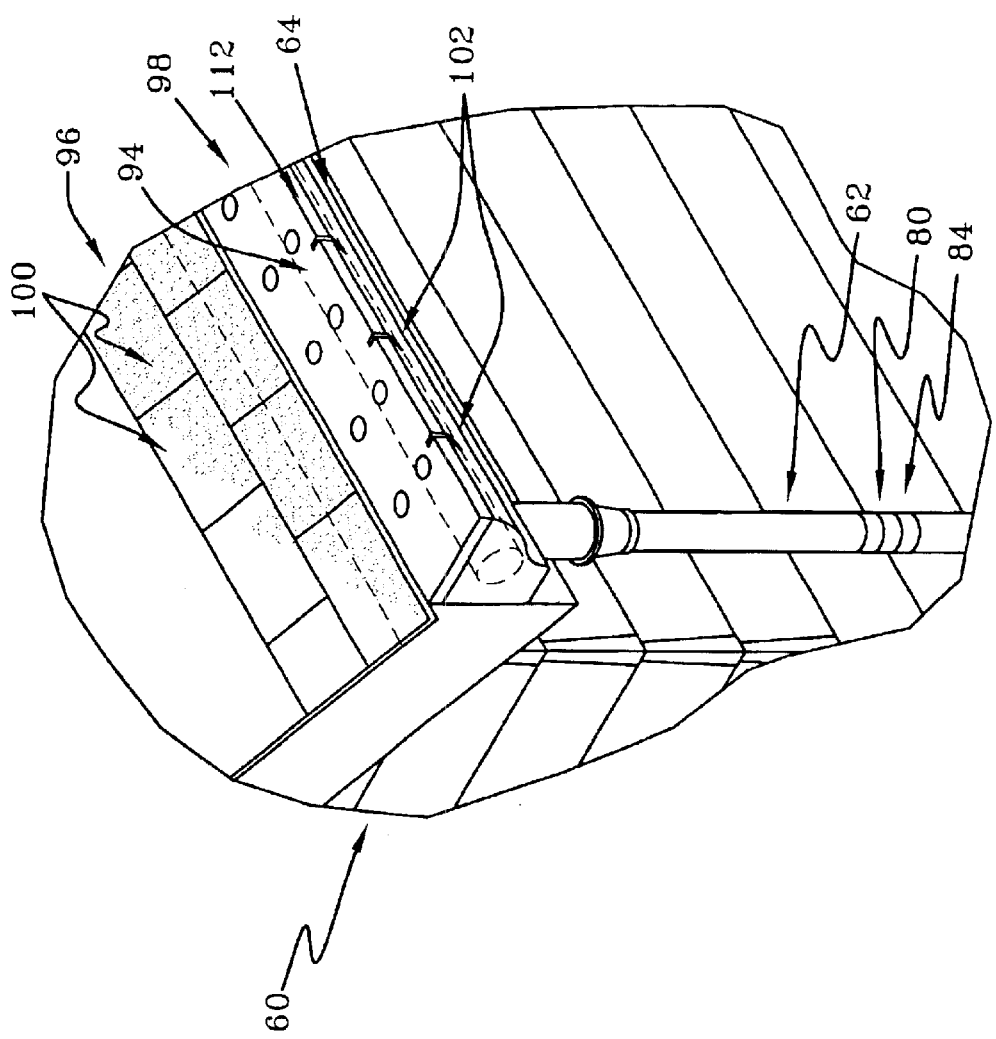
FIG. 6a is a perspective view of another embodiment of the present invention with the cleaning means attached to a building.
Figure 6C:
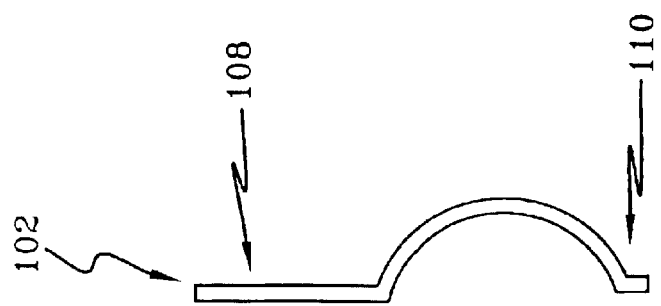
FIG. 6c is one embodiment of a means to attached the present invention to a gutter.

In another embodiment, shown in FIG. 6a, the first body portion 94 may have a first edge 96 and a second edge 98. The first edge 96 may be secured to the structure 60 by installing or pushing the first edge 96 under the separate roof shingles 100, of which a representative few are shown. The first edge 96 may also be secured to the structure 60 by screws, nails, bolts, or any other securing component or embracing means 50 chosen with sound engineering judgment. In this embodiment the second edge 98 of the first body portion 94 may be connected to the gutter 64 by using clips 102. The clips 102, shown in FIG. 6c, may have a link portion 108 and an attach portion 110. The link portion 108 may be flat or it may be curved to accommodate the structure of the gutter 64. The link portion 108 may be connected to the gutter 64 by welding, screwing, gluing, or by securing it in place in some other fashion. The link portion 108 may also be connected to the gutter 64 by snapping into place via a curved area that secures under the lip 112 of the gutter. The attach portion 110 of the clip 102 may connect to the second edge 98 of the first body portion 94 by the gluing, or screwing or welding, or any other means of securing. These clips 102 may be made out of plastic or metal or any other type of material chosen with sound engineering judgment. The clips 102 may secure the first body portion 94 second edge 98 to the gutter 64 at various points along the second edge 98 of the first body portion 94 and gutter 64. The clips 102 may be spaced 1' to 1½' apart or any distance chosen with sound engineering judgment.

Figure 6B:
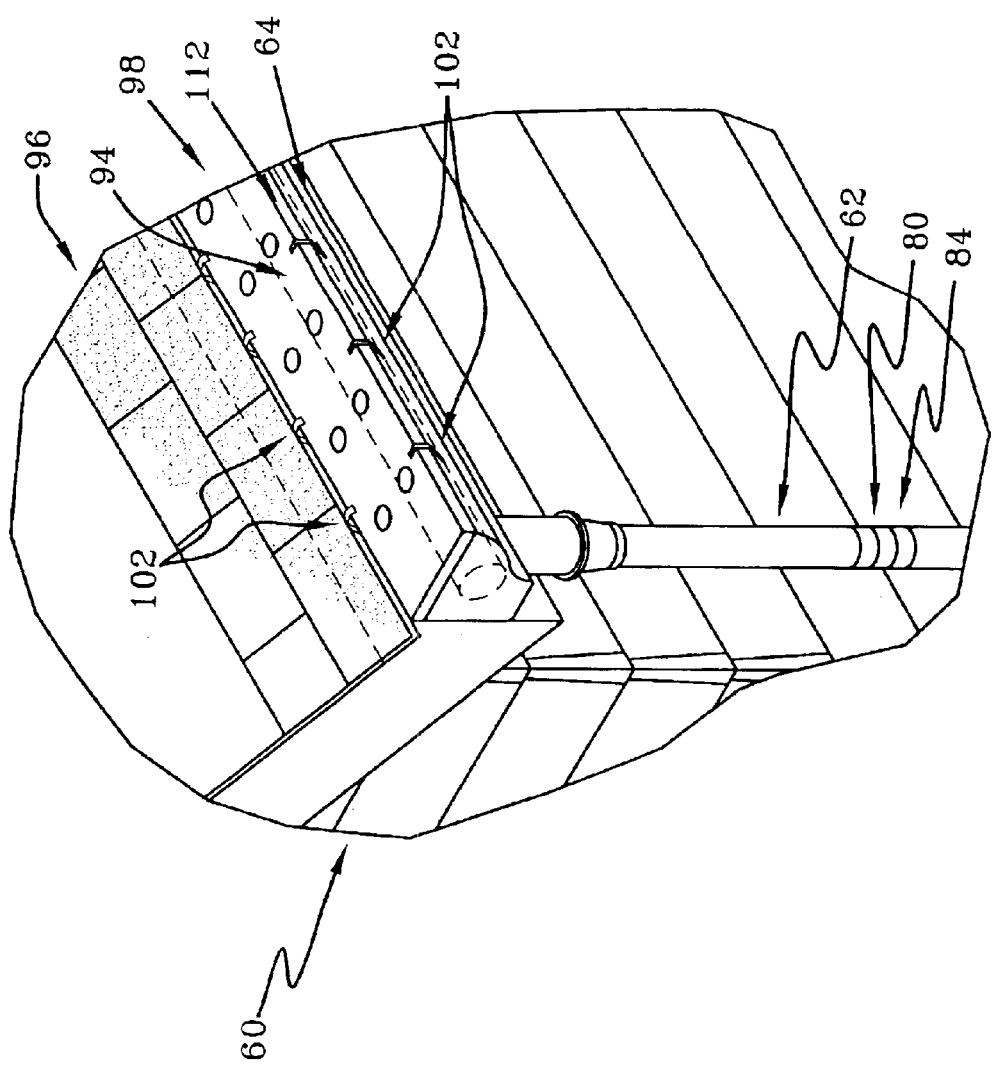
FIG. 6b is a perspective view of another embodiment of the present invention with the cleaning means secured to the gutter.

In another embodiment, shown in FIG. 6b, both the second edge 98 and the first edge 96 of the first body portion 94 may be attached to the gutter 64 using the clips 102, as described above concerning FIG. 6a. In this embodiment the first body portion 94 is not installed under the shingles 110 of the structure 60. Rather, the first body portion 94 may be connected to the gutter 64 solely by using the clips 102.

Continuing with reference to FIG. 6, as is commonly known, rainwater falls onto the roof 61 of the structure 60. This rainwater, in the present invention, will then flow into a plurality of openings 26 in the first body portion 94, which is attached to the top of the gutter pipe 64. Although the plurality of openings 26 shown are "holes" in the upper section 12, any other type of opening, chosen with sound engineering judgment, may be used that allow water flow into the gutter 64. For example, the first body portion 94 may have a single (or multiple) "slit" or other opening along its length though which rainwater may enter the gutter pipe 64. It is also contemplated that the first body portion 94 does not have any openings of any type. For example, the first body portion 94 may not completely cover the top of the gutter pipe 64. Thus, a "crack" or space may exist between an edge of the first body portion 94 and the edge of the gutter pipe 64. The rainwater can enter the gutter 64 through this space. The pipe 64 is typically angled so that the rainwater collected in the gutter 64 flows toward an outlet 65, through a downspout 62 and then to a next destination. This next destination varies with the particular use but includes a storm drain, a bucket, a barrel, the nearby ground, or into any other type of container or place. The present invention works well regardless of the next destination. As the rainwater travels along and down the roof 61, it may pick up shingle particles, dirt, twigs, leaves and other types of debris. This debris flows with the rainwater into the gutter pipe 64. As a result, the debris may become trapped within the pipe 64 and/or may accumulate within the gutter 64. Such debris may thus cause blockage within the pipe 64 and resultant drainage problems such as gutter pipes that overflow with water, and other related problems.

Since such problems are known, the gutter pipe 64 may incorporate a cleaning means 28 similar to the cleaning means previously discussed and depicted in FIGS. 1–3. The cleaning means 28 may incorporate the use of a tube 30 with small holes 32 located along its length. A fluid can then be forced through the tube 30, exiting through these holes 32. This fluid would force the debris to move toward the outlet area 65 of the gutter 64.

The pipe may also incorporate the use of an extension means 40, shown in FIG. 4, which allows a fluid source, such as a garden hose, to attach to the cleaning means 28. This extension means 40 may be connected at any place or location along the gutter 64 as determined with sound engineering judgment. The current invention contemplates other sources which can be utilized to remove debris from the gutter 64. For example, an air pressure hose may be connected to the cleaning means 28. Thus, by providing air pressure within the gutter 64, the debris may be moved towards the outlet 65 of the pipe 64.

Figure 7B:
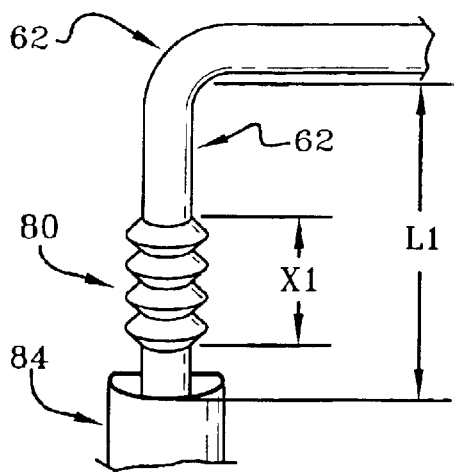
FIG. 7b is a view of the downspout when the flexible segment is in the expanded condition.
Figure 7C:
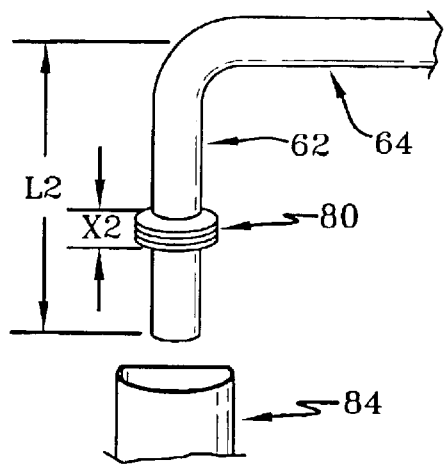
FIG. 7c is a view of the downspout when the flexible segment is in the compressed condition.
Figure 7A:
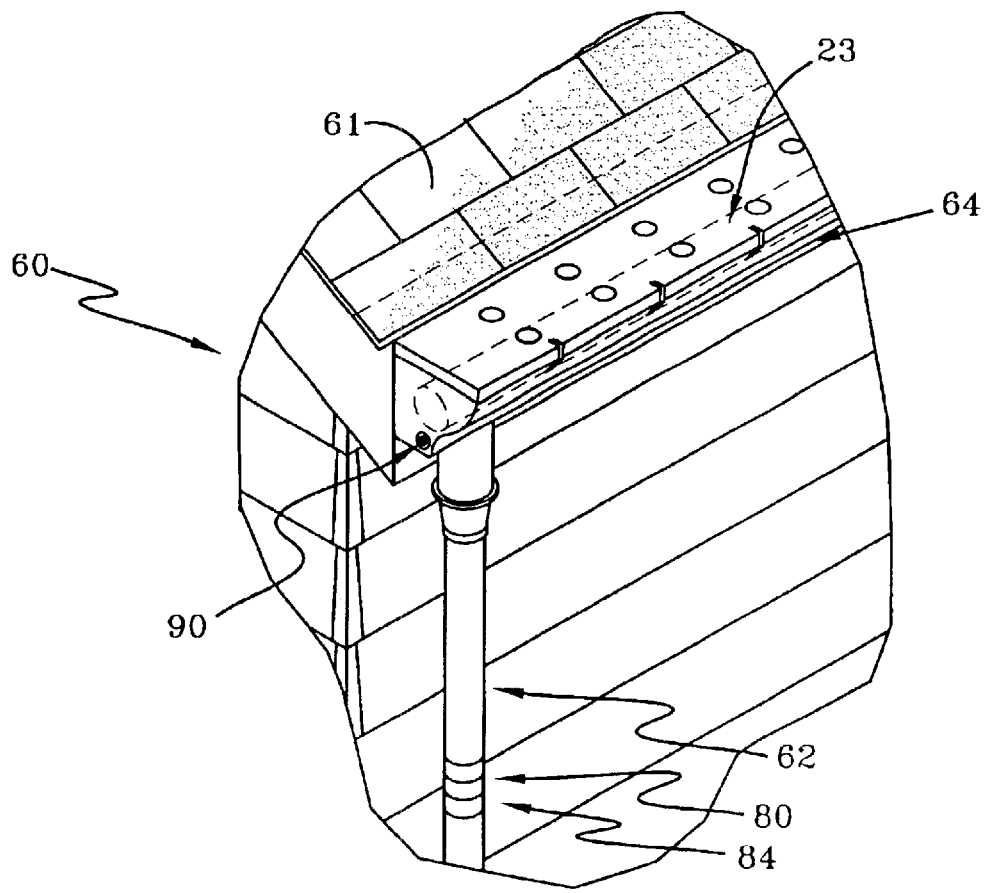
FIG. 7a is a perspective view of a downspout with a flexible segment.

Referring now to FIGS. 7a, 7b, and 7c, a perspective view of the downspout 62 having an inventive flexible segment 80 is shown. The flexible segment 80 is a portion of the downspout 62 which may be extended or compressed. When extended, as in FIG. 7b, the flexible segment 80 has an overall length of X1, and the downspout 62 has a length L1. When compressed, as in FIG. 7c, the flexible segment 80 has an overall length of X2, and the downspout 62 has an overall length of L2. The flexible segment 80 can assist in easily, and without tools, connecting and disconnecting the downspout 62 from the storm drainage pipe 64 or any other "downstream" connection. Of course no downstream connection of any type is required. The flexible segment 80 also provides a point about which the downspout 62 can pivot.

Figure 7D:
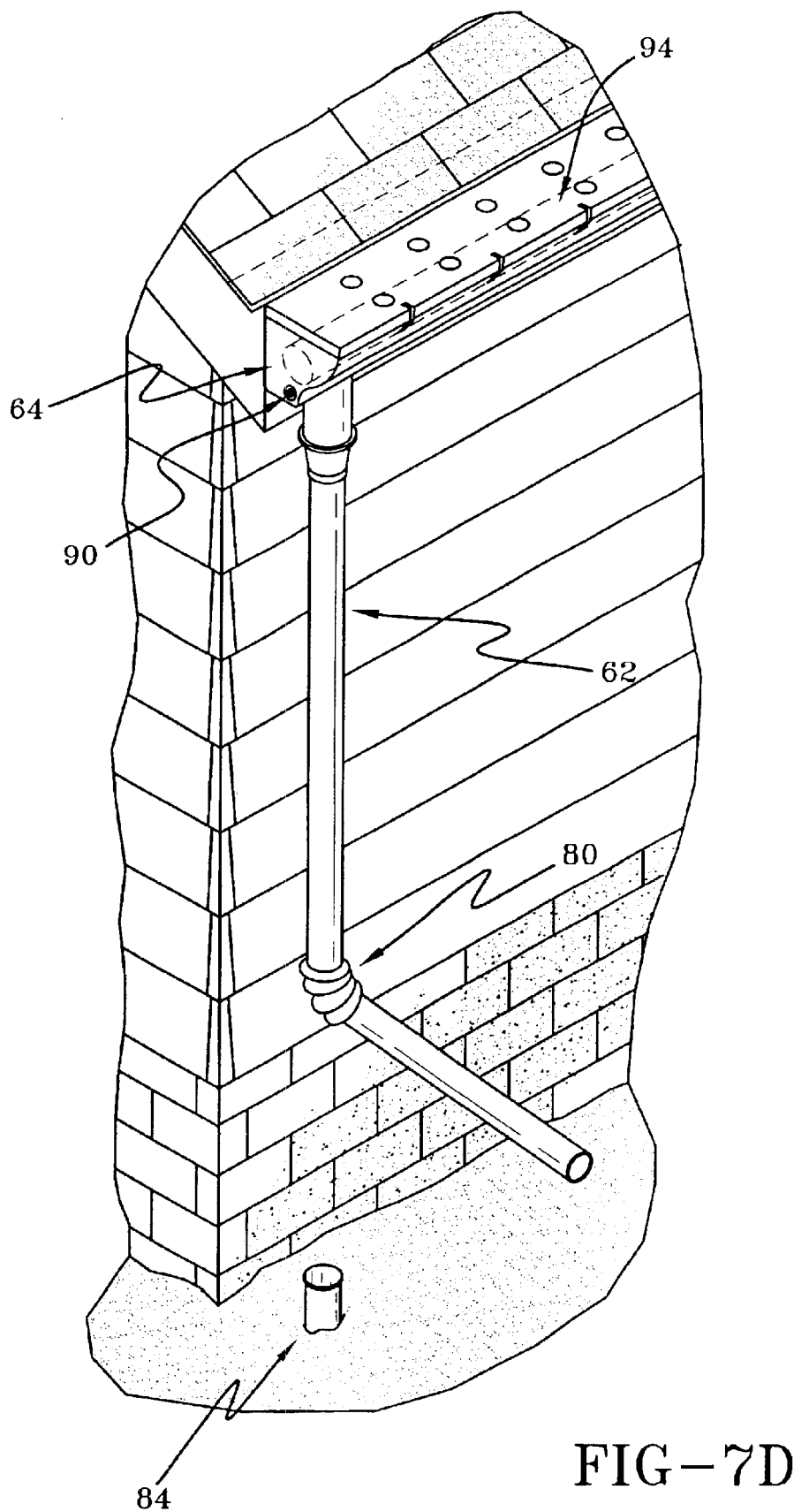
FIG. 7d is a view of the flexible segment used as a pivot point to direct the flow of water from the downspout away from the structure.

To remove the downspout 62 from the storm drainage pipe 84 or other connection, the operator may compress, squeeze, or push together the flexible segment 80 so it is at its shortest length, X1. The operator may then pull the downspout 62 out of the storm drainage pipe 84. Referring to FIG. 7d, the flexible segment 80 may become a pivot point about which the downspout 62 can pivot. The downspout 62 may then be used as an aid to divert the water to a desired location away from the house or structure. The flexible segment 80 may be constructed out of plastic tubing, rubber components or any other suitable material chosen with sound engineering judgment.

To insert the downspout 62 into the storm drainage pipe 84, the operator may compress the flexible segment 80, to allow the downspout 62 to be inserted into the storm drainage pipe 84. As the downspout 62 is inserted into the storm drainage pipe 84, the flexible segment 80 is expanded to an overall length of L2. The expansion of the flexible segment 80 allows the downspout 62 to cover the entire distance along the structure 64, from the gutter 64 to the storm drainage pipe 84.

With continuing reference to FIG. 7a, in operation it may be desirable to clean any debris out of the pipe 64 or the downspout 62 without draining the debris into the storm drain 84. This may be desirable because generally the storm drainage system continues underground with no easy accessibility. Blockage at this point would be costly and may require digging. In this case, prior to cleaning out the pipe 64 with the cleaning means 28 or the extension means 40, the downspout 62 may be removed from the storm drainage pipe 84 using the flexible segment 80. The downspout 62 may then be moved, pointed, or aimed away from the structure 60 pivoting the downspout 62 at the flexible segment 80. The cleaning fluid, or other cleaning source, may then be connected to the extension means 40, or directly to the cleaning means 28. The fluid will move the debris through the pipe 64, and down the downspout 62, and out onto the ground or other collection means. After completion of cleaning the pipe 64, the downspout 62 may be quickly re-connected to the storm drainage pipe 84 as previously discussed.

While the first body portion 94, the cleaning means 28, and the downspout 62 with flexible segment 80 may be considered separate units, it is also contemplated, that they may be combined as one unit, or as a "cleaning kit."

Figure 8:
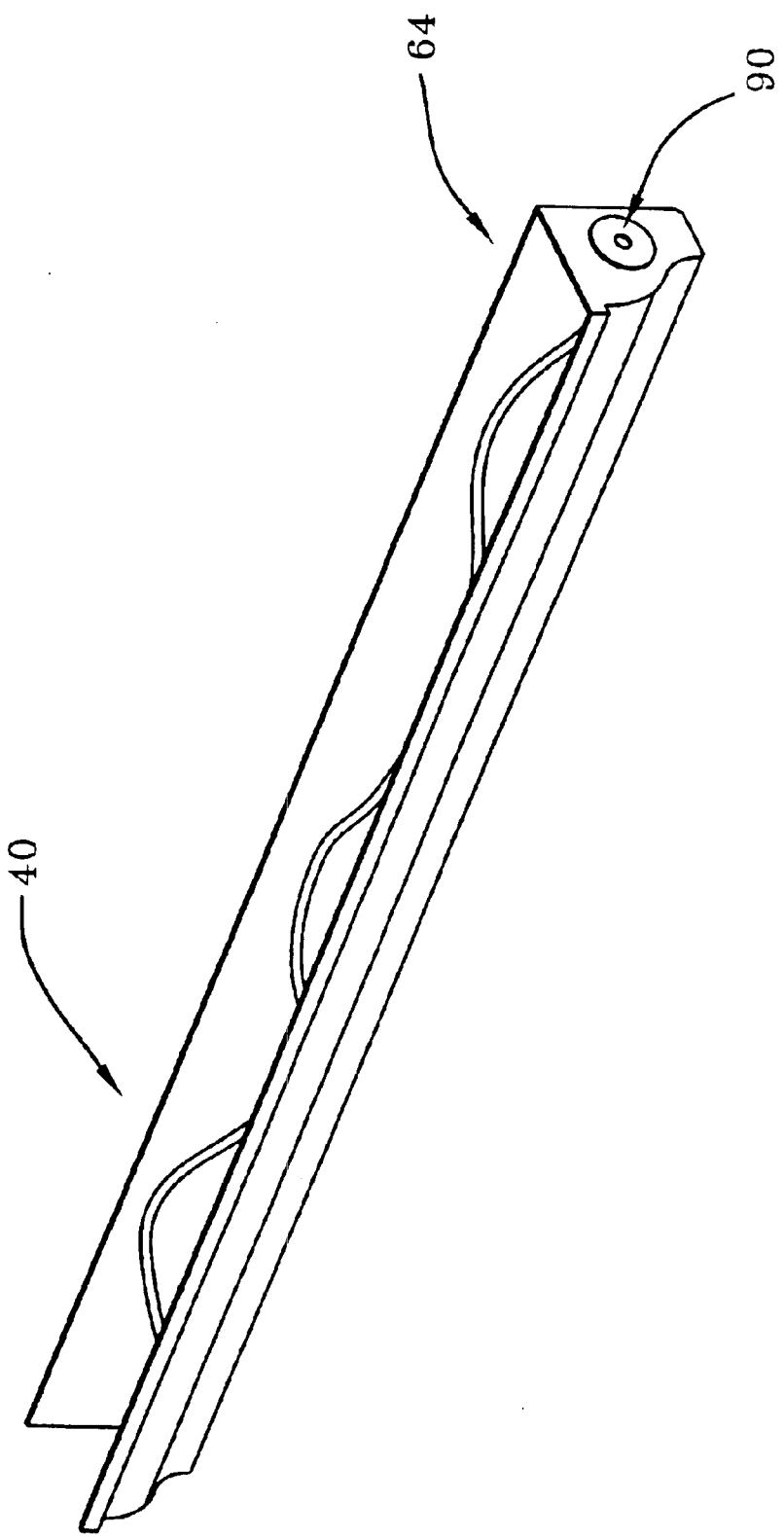
FIG. 8 is a perspective view of the present invention showing the use of a plumber's snake.

Referring now to FIG. 8, a perspective view of a gutter pipe 64 with a-flexible metal wire or coil 70 located along the inside of the pipe 64 is shown. The coil 70 operates similar to a "plumber's snake" used to clear plumbing drains. The coil 64 may be made out of metal or plastic or any other material chosen with sound engineering judgment. When the pipe 64 becomes clogged with debris, the coil 70 may be manually inserted into the gutter 64 at a connection point 90. This manual insertion may require the operator to push the coil 70 into the connection point 90 and keep pushing until the desired length of coil 70 is inserted into the gutter 64. This coil 70 will then move the debris assisting in breaking it down and dislodging it from the gutter 64. Although the connection point 90 shown is located at the end of the gutter 64, it is understood that the connection point 90 can be located at any location or position along the gutter 64 or the downspout 62. The connection point 90 may be made out plastic, or metal, or any other type of material that would provide an opening that, when not in use, may be watertight. The flexible coil 70 can be used alone, or it may be used in conjunction with the cleaning means 28 or extension means 40.

In another embodiment, the coil 70 may be permanently installed inside or near to the gutter pipe 64. This would eliminate the need for an operator to manually position the coil 70 into the connection point 90. However, the operator will still need to cause the coil 70 to move, eliminating the debris build up. This movement may be performed manually by pulling a section of the coil 70 out of the connection point 90 and manually rotating or moving the flexible coil 70 in a see-saw motion. This may also be performed by some type of motor (not shown) that, when energized, would automatically perform the movement of the coil 70 needed to loosen and dislodge the debris.

In yet another embodiment, the coil 70 may be attached to a reel (not shown). The operator would either manually or via a motor, unreel the coil 70 along the length of the gutter 64 when cleaning is desired. This unrolling of the reeled coil 70 may be performed in conjunction with the connection point 90. After the cleaning process is complete, the coil 70 may then be rolled onto the reel (not shown) either manually or via a motor.

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

What is claimed is:

1. A cleaning device comprising:

at least a generally longitudinal first body portion adapted to be fixed to an associated gutter pipe, the at least a first body portion having first and second sides extending the width of the associated gutter pipe, the at least a first body portion having at least a first opening for use in allowing associated fluid to enter the associated gutter pipe; and cleaning means for removing associated debris from said associated gutter pipe, said cleaning means being operatively connected to said first body portion.

2. The cleaning device of claim 1 wherein said cleaning means comprises:

a tube having at least first and a second holes therein adapted to communicate an associated cleaning fluid from said tube to the associated gutter pipe.

3. The cleaning device of claim 2 further comprising:

extension means extending from a first end of said tube.

4. The cleaning device of claim 2 wherein at least one of said first and second holes are angled relative to a plane of an outer surface of said tube.

5. The cleaning device of claim 4 wherein at least one of said first or said second holes are angled approximately 45° relative to said plane of said outer surface.

6. The cleaning device of claim 2 wherein said first body portion has a first edge adapted to be connected to an associated structure and a second edge adapted to be secured to the associated gutter.

7. The cleaning device of claim 6 further comprising:

at least a first clip adapted to secure said second edge of said first body portion to the associated gutter.

8. The cleaning device of claim 1 wherein said cleaning means also comprises:

a flexible coil.

* * * * *